US005163846A

United States Patent [19]

Lee

[11] Patent Number: 5,163,846

[45] Date of Patent: Nov. 17, 1992

[54] TOY USING WATER REACTIVE PAPER

[75] Inventor: James S. W. Lee, Long Island, N.Y.

[73] Assignee: C. J. Associated, Ltd., Liberia

[21] Appl. No.: 617,654

[22] Filed: Nov. 26, 1990

[51] Int. Cl.[5] .................... B43L 1/00; G09B 11/00; G09B 11/10

[52] U.S. Cl. .................... 434/408; 434/81; 434/84; 434/85; 434/87

[58] Field of Search .................... 434/81, 84, 85, 87, 434/98, 408, 413

[56] References Cited

U.S. PATENT DOCUMENTS

| | | | |
|---|---|---|---|
| 3,581,882 | 6/1971 | Bish | 434/81 |
| 3,838,520 | 10/1974 | Quenot | 434/410 |
| 4,139,965 | 2/1979 | Curry et al. | 434/84 |
| 4,604,062 | 8/1986 | Woods | 434/88 |
| 4,836,381 | 7/1989 | Edwards et al. | 434/81 |
| 4,836,783 | 6/1989 | Harper | 434/87 |

*Primary Examiner*—Gene Mancene
*Assistant Examiner*—Cindy A. Cherichetti
*Attorney, Agent, or Firm*—Laff, Whitesel, Conte & Saret

[57] ABSTRACT

A toy has a frame with a display area for receiving a water reactive paper. The paper has a brightly colored substrate covered by a surface layer of silica and resin which becomes transparent when wet and opaque when dry so that the bright color does or does not show through depending upon whether the surface is wet or dry. Thus, the paper appears to have disappearing ink.

8 Claims, 1 Drawing Sheet

TOY USING WATER REACTIVE PAPER

This invention relates to toys involving writing, drawing, and other graphic skills and more particularly to toys which use a water reactive paper on which writing appears when wet and fades as the paper dries. The invention may also be used as a hobby and craft activity item.

People of all ages, and especially children, like to draw pictures, leave messages, doodle, and the like. For the smaller children, this kind of activity provides a learning experience involving small muscle coordination, forms and shapes, the alphabet, and the like. From the parent's viewpoint, it is desirable to have an added interest which will induce the child to undertake and retain interest in these learning experiences. For the older children, such a toy provides outlets for imaginative fantasies. For example, a disappearing ink permits a child to play "spies", or the like. There are many other games for persons of all ages which may be based upon disappearing ink.

Another use of a device such as this is to provide a practice pad for use by someone who is learning to write or draw certain special designs. An example of this usage is where someone is practicing the writing of oriental calligraphy, as where one is learning to write Chinese or Japanese characters, for example. It will save a lot of paper if one can write a page full of characters and then lay it aside until it is dry, at which time the writing has disappeared so that the same page may be reused.

Accordingly, an object of the invention is to provide new and improved means for and methods of providing entertainment with disappearing ink. Here, an object is to provide a toy for use by children, especially small children. Another object is to provide new activity accessories that can be used to dampen water reactive paper in order to provide fun and amusement for those who are inclined to drawing or doodling. In this connection, an object is to provide a toy of the described type where the written display may be preserved to show mommy or daddy, and then be allowed to disappear after they have seen it.

Another object of the invention is to provide an improved magic and surprise material for the fun and amusement for the young and old alike.

Another object of the invention is to provided a graphic pad which may be used and reused to practice writing. Here an object is to provide a writing pad which is sturdy enough to survive such repeated usage.

Still another object of the invention is to provide a manipulative activity toy, which is inexpensively and readily fabricated and assembled at low cost from readily available materials and by workers with no special skill level or training.

In keeping with an aspect of the invention, these and other objects are accomplished by a toy having a frame with a display area for receiving a sheet of water reactive paper. The frame includes a means for enabling an insertion and removal of the water reactive paper. The frame also contains a water well which may be used to wet a writing stylus. If desired, the paper may be placed in a freezer in order to prolong the message and to prevent its rapid disappearance.

The conventional oriental user needs an accessory such as a brush pen, which is dipped in water and then used to write on the paper. Other accessories for use with this paper include such things as: stamps, rollers, stencils, etc. A container, such as a spray bottle, may be filled with water to spray through a stencil and onto the water reactive paper surface in order to form desired designs of a wetted surface on the water reactive paper.

A preferred embodiment of the invention is shown in the attached drawing in which.

Figure 1:
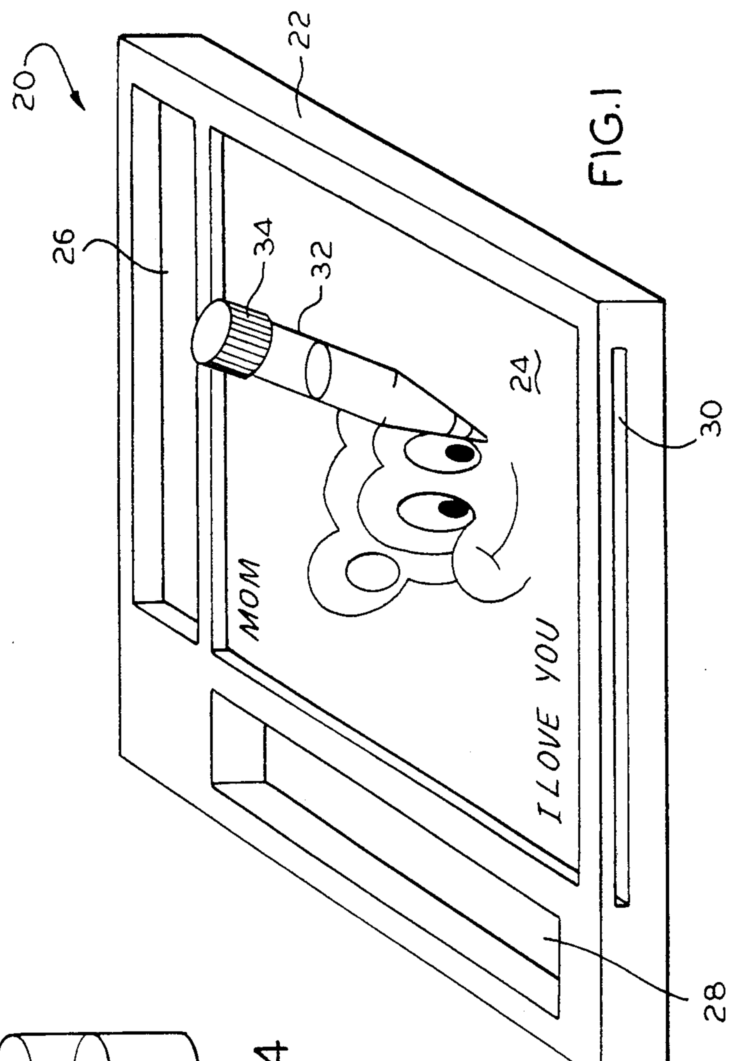
FIG. 1 is a perspective view of a toy incorporating the invention.
Figure 6:
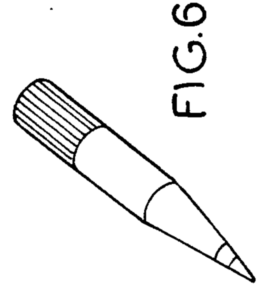
FIG. 6 is a perspective view of a fifth accessory in the form of a marker.

The invention uses a special water reactive paper product as a sheet means for a toy. This type of paper is made with a coating, which becomes transparent when it is wetted. The underlying vivid and bright colors appear from the color of the paper substrate underneath the transparent coating. Upon an evaporation, the wetted writing gradually disappears due to air-drying. That is, when the water eventually dries, within a short period of time, the coating is no longer transparent and the bright underlying color of the paper substrate disappears. For durability, the same coating process can be applied on a more durable substrate, such as colored PVC sheets, with either a solid color or a multi-color base.

One manufacturer of the water reactive paper is JIN AN Industrial Co. Ltd., 175 Min Tsu West Road, Taipei, Taiwan Roc. with an in-house plant at 21, Tsun Yuen Road 1, Chung Yang Industrial Estate, Taipei. The paper is sold under the trademark "Water Writer", as item No. 961.

The manufacturer describes the paper as being 200 lb simile paper, in 0.18 mm thickness, which has a solid neon color set in a printing process. The paper is given a white 0.03 mm thick chemical coating of silica ($SIO_2$) which is applied with a knife coating process and then is naturally dried at 25° Celsius during approximately a 20 minute period although drying may be carried out in an automatic oven.

The chemical silica has a characteristic causing it to remain an opaque solid when it is dry and to become transparent when it is wet. The material also has other absorbency features. A resin ingredient is applied in the silica coating composition to prevent permanent tracings, thus making possible the repeated use of the wet/dry sequence without deteriorating either the silica coating or the paper stock quality.

Thus, the invention begins with an existing neon coated substrate, such as a bright and vivid colored paper stock, which is commonly available in the market place and which is known as "water reactive paper".

The inventive toy 20 comprises a sheet retainer in the form of frame 22 having a water reactive paper display area 24, a water well 26, and an accessory tray 28. The paper is inserted into and removed from the display area 24 via a slot 30 in the side of the frame 22. The user may employ any suitable accessory or instrument to write on the water reactive paper while it is in the frame 22. The back of the frame is a solid surface for supporting the sheet of water reactive paper while the user is writing thereon.

The toy 20 is here shown as being used in connection with a number of game pieces, one of which is a water pen 32 which is an elongated, hollow cylinder in a size and shape of a pencil or ball point pen. A rubber stopper 34 may close the top of the cylinder after it has been filled with water. In the alternative, the tip of the water pen may be dipped in water. Then the cylinder may be squeezed and released to draw water into the cylinder. As here shown, the water pen is being used to draw a cartoon face and has already been used to print the words "Mom" and "I love you".

Figure 2:
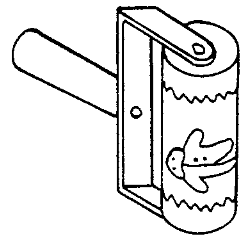
FIG. 2 is a perspective view of a first accessory in the form of a roller with a design embossed thereon.
Figure 3:
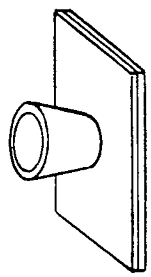
FIG. 3 is a perspective view of a second accessory in the form of a rubber stamp.

Other game piece accessories which may be used with the inventive toy include a roller (FIG. 2) having a design embossed on its surface to function somewhat like a rubber stamp. FIG. 3 shows a rubber stamp which has a flat face plate with a design embossed thereon. Either the roller or flat stamp is pressed upon a pad (or the like) to wet the upper edge or crest of the embossment which is then pressed upon the surface of the water reactive paper.

Figure 4:
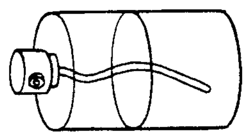
FIG. 4 is a perspective view of a third accessory in the form of a spray bottle for wetting the water reactive paper.
Figure 5:
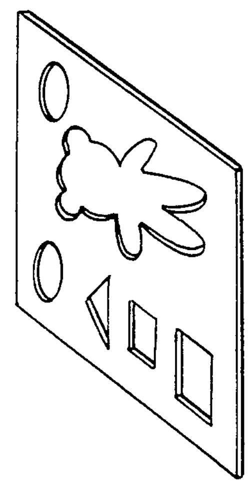
FIG. 5 is a perspective view of a fourth accessory in the form of a stencil.

FIG. 4 shows a spray bottle of water. FIG. 5 shows a stencil which may be laid upon the top of the water reactive paper. Then water is sprayed from the bottle, through the stencil, to record a picture upon the water reactive paper.

The marker of FIG. 5 is similar to water pen 32 in FIG. 1. The tip may be either a small capillary steel tube or a felt tip. Either way, the water within the cylinder is released in quantities appropriate for writing upon the water reactive paper.

One can imagine a number of different games which may be played on the toy. For example, the stencil of FIG. 5 may be a tic-tac-toe sign which is applied to the water reactive paper with the aid of the spray can of FIG. 4, after which, the players use the pen 32 to play a game.

Those who are skilled in the art will readily perceive how to modify the invention. Therefore, the appended claims are to be construed to cover all equivalent structures which fall within the true scope and spirit of the invention.

The claimed invention is:

1. A toy comprising a sheet of water reactive paper, a frame having display area for receiving said sheet of water reactive paper, a well for receiving water, and at least one accessory for wetting the surface of said paper in a selected design, said accessory comprising a water pen having a cylindrical tube terminating in a tip on one end and sealed on the other end, said cylinder holding water, and said tip releasing water in quantities which are appropriate for writing on a surface of said reactive paper.

2. The toy of claim 1 and a slot in said frame for inserting said water reactive paper into and removing it from said display area.

3. The toy of claim 1 wherein said water reactive paper is a colored substrate having a surface which becomes transparent when wet in order to let the color of said substrate be seen and which becomes opaque when dry to cover said color.

4. The toy of claim 1 wherein said water reactive paper comprises a surface coating that includes silica and resin.

5. The toy of claim 1 wherein said water reactive paper is a sheet of PVC coated with a combination of silica and resin.

6. The toy of claim 1 wherein said water reactive paper has characteristics which retains said color when said paper is frozen.

7. A toy comprising at least one sheet means for reacting to water by displaying a graphic image in a shape and pattern of water applied to the surface thereof, said sheet means comprising a colored substrate and a layer integrally formed over at least a portion of said substrate, said layer being opaque when dry and transparent when wet whereby said color of said substrate shows through said layer only when said layer is wet, a water pen having a cylindrical tube terminating in a tip on one end and sealed on the other end, said cylinder holding water and said tip releasing water in quantities which are appropriate for writing on said layer for selectively wetting said layer in a desired pattern during play with said toy, and retainer means for holding said sheet means during at least part of a play time with said game.

8. A toy comprising at least one sheet means wherein said sheet is PVC coated with a combination of silica and resin for reacting to water by displaying a graphic image in a shape and pattern of water applied to the surface thereof, said sheet means comprising a colored substrate and a layer integrally formed over at least a portion of said substrate, said layer being opaque when dry and transparent when wet whereby said color of said substrate shows through said layer only when said layer is wet, at least one game piece for selectively wetting said layer in a desired pattern during play with said toy, and retainer means for holding said sheet means during at least part of a play time with said game.

* * * * *

UNITED STATES PATENT AND TRADEMARK OFFICE

CERTIFICATE OF CORRECTION

PATENT NO. : 5,163,846

DATED : November 17,1992

INVENTOR(S) : Lee, et. al.

It is certified that error appears in the above-indentified patent and that said Letters Patent is hereby corrected as shown below:

On the Title page, item [73], Assignee: should read --C.J. Associates, Ltd.

Signed and Sealed this

Ninth Day of November, 1993

Attest:

BRUCE LEHMAN

Attesting Officer

Commissioner of Patents and Trademarks